(12) United States Patent
Glaser et al.

(10) Patent No.: US 6,397,241 B1
(45) Date of Patent: May 28, 2002

(54) MULTIPLIER CELL AND METHOD OF COMPUTING

(75) Inventors: Philipp Michael Glaser, Tempe; Michael J. Torla, Chandler, both of AZ (US)

(73) Assignee: Motorola, Inc., Schaumberg, IL (US)

( * ) Notice: Subject to any disclaimer, the term of this patent is extended or adjusted under 35 U.S.C. 154(b) by 0 days.

(21) Appl. No.: 09/215,935

(22) Filed: Dec. 18, 1998

(51) Int. Cl.[7] .................................................. G06F 7/52
(52) U.S. Cl. ...................................................... 708/625
(58) Field of Search ................................ 708/620–632, 708/700–714, 518

(56) References Cited

U.S. PATENT DOCUMENTS

| | | | | |
|---|---|---|---|---|
| 4,707,800 A | * | 11/1987 | Montrone et al. ............ 708/518 |
| 4,994,997 A | * | 2/1991 | Martin et al. ................ 708/627 |
| 5,010,511 A | * | 4/1991 | Hartley et al. ............... 708/653 |
| 5,189,636 A | * | 2/1993 | Patti et al. .................. 708/518 |
| 5,262,975 A | * | 11/1993 | Ohki ........................... 708/625 |
| 5,511,018 A | * | 4/1996 | Wittmann et al. ........... 708/625 |
| 5,636,351 A | * | 6/1997 | Lee ............................. 708/620 |
| 5,724,276 A | * | 3/1998 | Rose et al. .................. 708/700 |

* cited by examiner

Primary Examiner—Tan V. Mai

(57) ABSTRACT

An integrated cryptographic system (24) executes a mathematical algorithm that computes equations for public-key cryptography. An arithmetic processor (22) receives data values stored in a temporary storage memory (14) and computes both the Rivest-Shamir-Adleman (RSA) and Elliptic Curve Cryptography (ECC) algorithms. Multiplication cells (270 and 280) have an INT/POLY terminal that selects a C-register (246) for computing RSA modular exponentiation or ECC elliptic curve point multiplication.

5 Claims, 5 Drawing Sheets

MULTIPLIER CELL AND METHOD OF COMPUTING

BACKGROUND OF THE INVENTION

The present invention relates, in general, to public-key cryptography and, more particularly, to a public-key cryptographic integrated circuit.

Rivest-Shamir-Adleman (RSA) and Elliptic Curve Cryptography (ECC) are public-key cryptographic algorithms that provide high security for digital data transfers between electronic devices. The modular mathematics of the RSA and ECC (Fp) algorithms can be computed on a hardware multiplier and the polynomial mathematics of the ECC ($F2^M$ in polynomial-basis) algorithm can be computed on a different hardware multiplier. Both hardware multiplier architectures that are used for computing the RSA and ECC algorithms can use pipelining techniques for the massive parallel computations of the algorithms. The pipelined multiplier offers lower power which is required for many applications.

Hardware implementations for computing RSA and ECC algorithms is not straight forward. Thus, the type of cryptography best suited for the system application defines the appropriate hardware multiplier architecture that computes the desired RSA or ECC algorithms. With increasing demand for faster cryptographic operations and higher performance, hardware modular multiplier architecture improvements are needed to ensure high levels of security.

Accordingly, it would be advantageous to provide cryptography in a multiplication system that achieves high performance, low cost, and low-power for implementation in an integrated circuit. It would be a further advantage for the multiplication system to compute the RSA and ECC algorithms.

DETAILED DESCRIPTION OF THE PREFERRED EMBODIMENT

Generally, the present invention of an integrated cryptographic circuit provides cryptographic functions that support Rivest-Shamir-Adleman (RSA) and Elliptic Curve Cryptography (ECC) algorithms. The cryptographic integrated circuit has applications in internet commerce, paging, cellular phones, smartcards, and smartcard terminals, among others. Data, such as personal health records, financial records, finger prints, and retina eye prints is encrypted using functions that include integer modular multiplications, modular polynomial multiplication, addition, subtraction, and exponentiation. The integrated cryptographic circuit provides a hardware architecture that efficiently computes both the RSA and the ECC algorithms.

Figure 1:
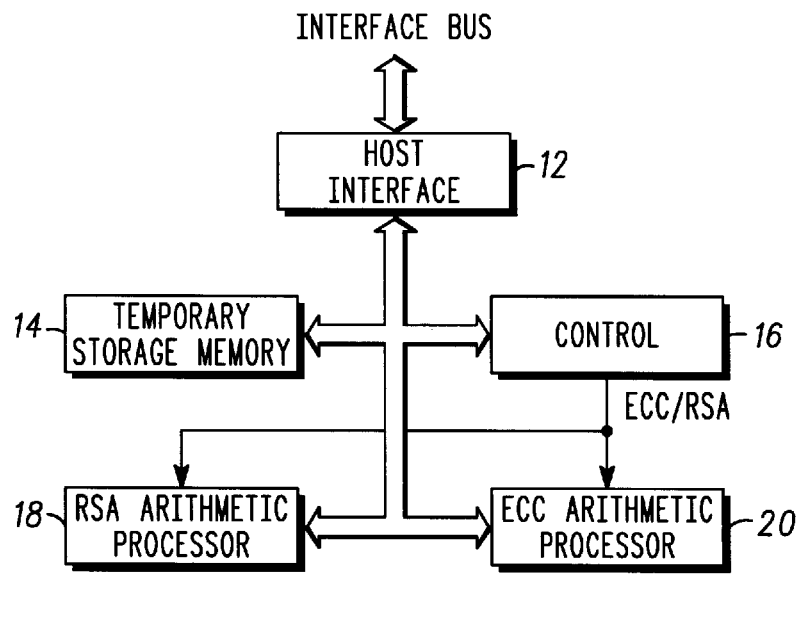
FIG. 1 is a block diagram illustrating one embodiment of an integrated cryptographic system having an RSA arithmetic processor and a separate ECC arithmetic processor.

FIG. 1 is a block diagram illustrating an embodiment of an integrated cryptographic system 10 having an RSA arithmetic processor 18 and a separate ECC arithmetic processor 20. The single chip cryptographic system 10 is configured to operate in a data communication network and perform cryptographic functions using either the RSA or ECC algorithms. Cryptographic system 10 includes a host interface block 12 having an input connected to an INTERFACE BUS. Data signals are transmitted and received via the INTERFACE BUS to/from other electronic devices (not shown) outside cryptographic system 10. By way of example, a microprocessor, a Random Access Memory (RAM), a Read Only Memory (ROM), a Memory Access Controller (MAC), a Secure Memory Management Unit (SMMU), and a Universal Asynchronous Receive/Transmit (UART) block are electronic devices external to cryptographic system 10 that provide and control data at the terminals of Host Interface block 12. The blocks external to cryptographic system 10 are not shown in the figures.

Cryptographic system 10 further includes a temporary storage memory 14 having an input connected to Host Interface block 12. Temporary storage memory 14 receives data values that allow cryptographic system 10 to perform public-key cryptographic functions. Thus, memory 14 stores the data values that support the RSA modular exponentiation performed by RSA arithmetic processor 18 and, in addition, the data values that support the elliptic curve point multiplication performed by ECC arithmetic processor 20.

Specifically, for the RSA modular exponentiation, memory 14 stores data values such as a modulus value N, operand values A and B, exponent values, and partial product values. In addition, for the ECC elliptic curve point multiplication, memory 14 stores data values such as an irreducible polynomial, a value for odd prime fields, an ECC system-wide parameter for the generator point, elliptic curve coefficients, a point scalar, and temporary values.

Typically, the storage capacity of memory 14 roughly supports a four to one key size ratio of RSA to ECC. For example, if the memory supported an RSA key size of 1024 bits, then the same memory could approximately support an ECC key size of up to 256 bits. Thus, memory 14 provides for a lower level of security when using the RSA algorithm compared to using the ECC algorithm. By using memory 14 to store data values for both RSA arithmetic processor 18 and ECC arithmetic processor 20, the silicon area and total cost of cryptographic system 10 is reduced.

Similar types of software instructions can be used for computing both the ECC and RSA algorithms. By way of example, the RSA algorithm uses the binary square-and-multiply routine in computing exponential functions while the ECC algorithm uses the double-and-add routine in the computation of point multiplies. Thus, similar software routines are used to support mathematical operations using either the RSA or ECC algorithm. Similarities can also be found between multiplies of the respective algorithms, e.g., integer modulo-N for RSA and modular multiplies in the polynomial-basis for ECC.

In operation, the data values stored in memory 14 are transferred to RSA arithmetic processor 18 or to ECC arithmetic processor 20. A control circuit 16 provides control signals that manage the transfer of data values between memory 14, RSA arithmetic processor 18, ECC arithmetic processor 20, and Host Interface block 12. In addition, the control signals generated in control block 16 control the mathematical computations that are provided by RSA arithmetic processor 18 and ECC arithmetic processor 20 in the processing of data. Put another way, a control signal from control block 16 enables RSA arithmetic processor 18 for computing the RSA algorithm or ECC arithmetic processor 20 for computing the ECC algorithm. The similarities that exist between the RSA and ECC algorithms reduce the number of control signals generated by control circuit 16.

Figure 2:
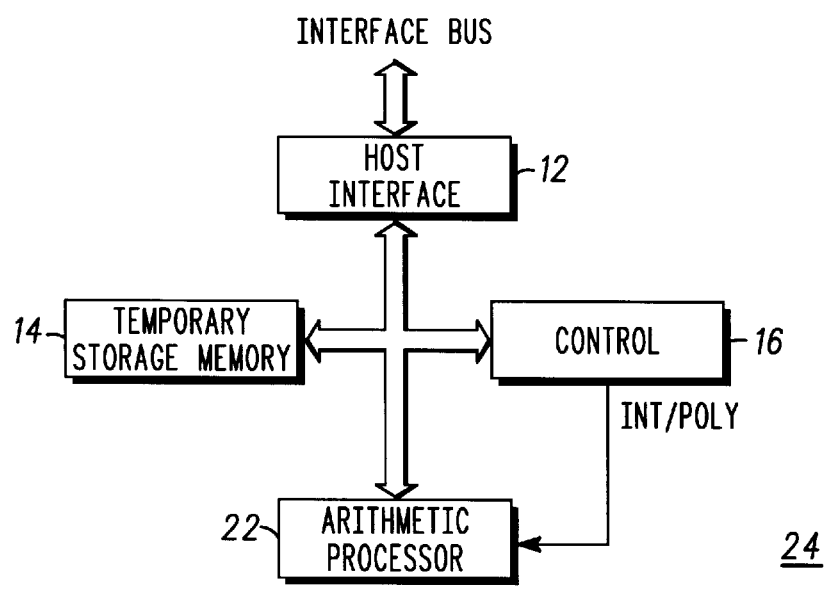
FIG. 2 is a block diagram illustrating another embodiment of an integrated cryptographic system having a single processor for computing algorithms for both RSA and ECC data cryptography.

FIG. 2 is a block diagram illustrating another embodiment of an integrated cryptographic system 24 having a single arithmetic processor 22 for computing RSA and ECC algorithms. It should be noted that the same reference numbers are used in the figures to denote the same elements. This embodiment of cryptographic system 24 connects other electronic devices (not shown) to host interface block 12 through an INTERFACE BUS. Data signals are transferred through Host Interface block 12 to temporary storage memory 14 for storing data. Control circuit 16 provides control signals to arithmetic processor 22 that manage the transfer of data values from temporary storage memory 14 and control the functions provided by arithmetic processor 22. One such control signal generated by control circuit 16 is the INT/POLY signal that selects or enables arithmetic processor 22 to generate the mathematical operations of the RSA algorithm and the ECC algorithm. Thus, arithmetic processor 22 provides cryptographic functions based either on RSA modular exponentiation or ECC elliptic curve point multiplication.

Figure 3:
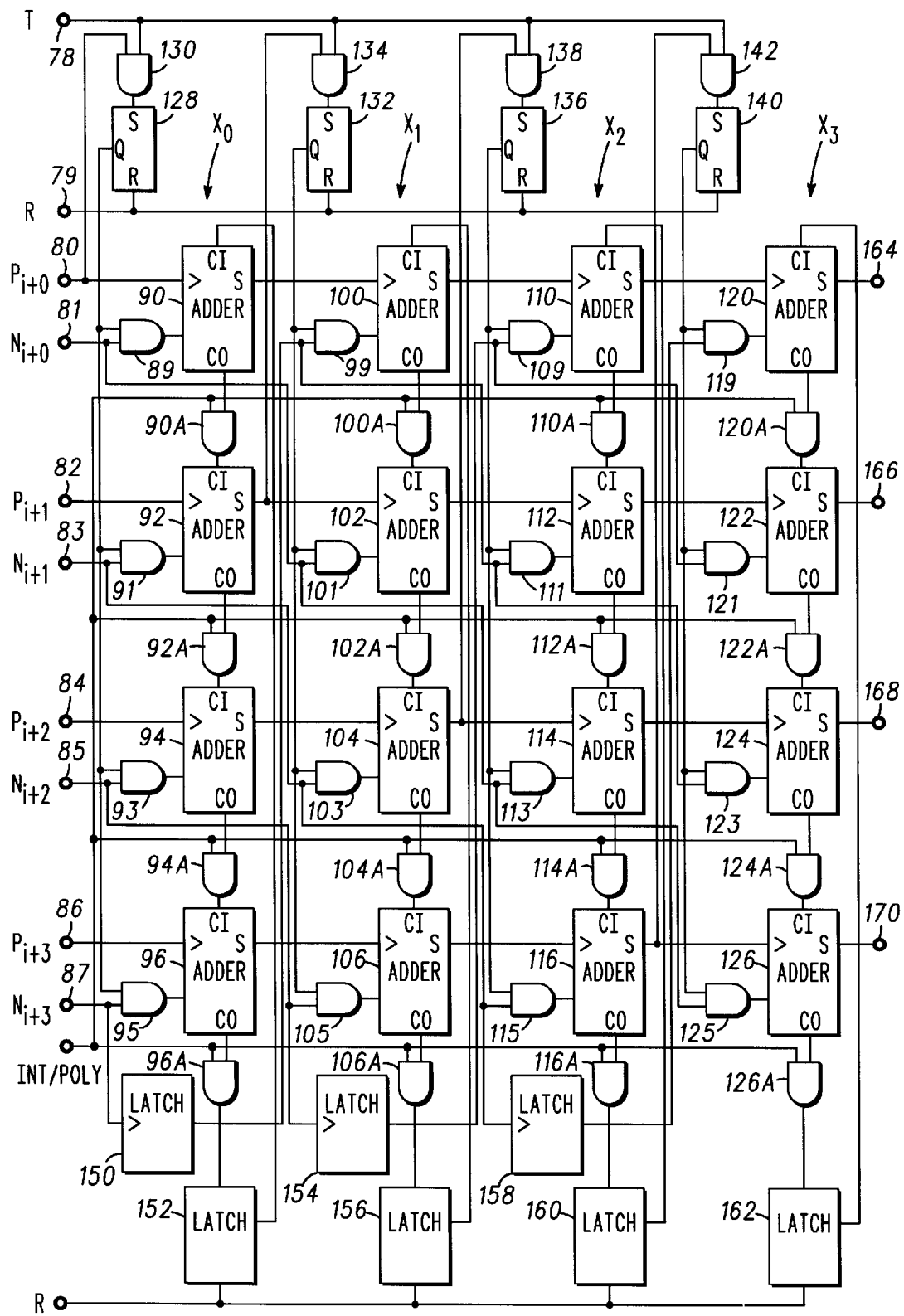
FIG. 3 is a schematic diagram showing one embodiment of a portion of the single processor of FIG. 2.

FIG. 3 is a schematic diagram showing one embodiment of a portion of the single arithmetic processor 22 of FIG. 2. Arithmetic processor 22 performs a multiplication of operands A and B and supplies a product value, i.e., $P_{i+0}$, $P_{i+1}$, $P_{i+2}$, and $P_{i+3}$, to a modulo reducer 60. Operands A and B can by numerical data or plain text strings that are converted to ordinal numbers using American Standard Code for Information Interchange (ASCII) or other transformed character sets.

Modulo reducer 60 of arithmetic processor 22 includes an adder array having X columns and Y rows, where X and Y are integer numbers. The preferred embodiment of the adder array has sixteen columns and sixteen rows. However, it should be noted that the present invention is not limited to an adder array having sixteen columns and sixteen rows or to an array having matching numbers of rows and columns. Modulo reducer 60 is described in simplified form for simplicity and illustrative purposes as being a four by four array of adders along with associated logic.

Adders 90, 92, 94, and 96 are in column $X_0$, adders 100, 102, 104, and 106 are in column $X_1$, adders 110, 112, 114, and 116 are in column $X_2$, and adders 120, 122, 124, and 126 are in column $X_3$ of the adder array of modulo reducer 60. Adders 90–96, 100–106, 110–116, and 120–126 each have first and second data inputs, a carry input (CI), a carry output (CO), and a sum output (S).

The first inputs of adders 90, 92, 94, and 96 in column $X_0$ are connected to respective input terminals 80, 82, 84, and 86. Two input AND-gates 89, 91, 93, and 95 each have a first input commonly connected to each other and to a Q output of a latch 128. The outputs of AND-gates 89, 91, 93, and 95 are connected to the second inputs of adders 90, 92, 94, and 96, respectively. In addition, a carry output (CO) of adder 90 is coupled through an AND-gate 90A to a carry input (CI) of adder 92, a carry output of adder 92 is coupled through an AND-gate 92A to a carry input of adder 94, and a carry output of adder 94 is coupled through an AND-gate 94A to a carry input of adder 96. The carry output of adder 96 is coupled through an AND-gate 96A to a data input of a latch 152. The output of latch 152 is connected to the carry input of adder 90.

Logic gates such as, for example, AND-gates 90A, 92A, 94A, and 96A are also referred to as blocking circuits. When the select or enable signal common to all of the blocking circuits has a logic one value, then the carryin signal is transferred through the blocking circuit. On the other hand, when the select or enable signal has a logic zero value, then the carryin signal is blocked or inhibited from propagating through the blocking circuit.

The first inputs of adders 100, 102, 104, and 106 in column $X_1$ are connected to the respective outputs of adders 90, 92, 94, and 96 in column $X_0$. Two input AND-gates 99, 101, 103, and 105 have a first input commonly connected to each other and to a Q output of a latch 132. The outputs of AND-gates 99, 101, 103, and 105 are connected to the second inputs of adders 100, 102, 104, and 106, respectively. In addition, a carry output of adder 100 is coupled through an AND-gate 100A to a carry input of adder 102, a carry output of adder 102 is coupled through an AND-gate 102A to a carry input of adder 104, and a carry output of adder 104 is coupled through an AND-gate 104A to a carry input of adder 106. The carry output of adder 106 is coupled through an AND-gate 106A to a data input of a latch 156. The output of latch 156 is connected to the carry input of adder 100.

The first inputs of adders 110, 112, 114, and 116 in column $X_2$ are connected to the respective outputs of adders 100, 102, 104, and 106 in column $X_1$. Two input AND-gates 109, 111, 113, and 115 have a first input commonly connected to each other and to a Q output of a latch 136. The outputs of AND-gates 109, 111, 113, and 115 are connected to the second inputs of adders 110, 112, 114, and 116, respectively. In addition, a carry output of adder 110 is coupled through an AND-gate 110A to a carry input of adder 112, a carry output of adder 112 is coupled through an AND-gate 112A to a carry input of adder 114, and a carry output of adder 114 is coupled through an AND-gate 114A to a carry input of adder 116. The carry output of adder 116 is coupled through an AND-gate 116A to a data input of a latch 160. The output of latch 160 is connected to the carry input of adder 110.

The first inputs of adders 120, 122, 124, and 126 in column $X_3$ are connected to the respective outputs of adders 110, 112, 114, and 116 in column $X_2$. Two input AND-gates 119, 121, 123, and 125 have a first input commonly connected to each other and to a Q output of a latch 140. The outputs of AND-gates 119, 121, 123, and 125 are connected to the second inputs of adders 120, 122, 124, and 126, respectively. In addition, a carry output of adder 120 is coupled through an AND-gate 120A to a carry input of adder 122, a carry output of adder 122 is coupled through an AND-gate 122A to a carry input of adder 124, and a carry output of adder 124 is coupled through an AND-gate 124A to a carry input of adder 126. The carry output of adder 126 is coupled through an AND-gate 126A to a data input of a latch 162. The output of latch 162 is connected to the carry input of adder 120. The output S of adders 120, 122, 124, and 126 are connected to respective output terminals 164, 166, 168, and 170. AND-gates 90A–96A, 100A–106A, 110A–116A, and 120A–126A are enabled when arithmetic processor 22 is computing integer-modulo-N multiplications and not enabled when the arithmetic processor is computing modular polynomial-basis multiplications. In other words, the carryout signal of respective adders 90–96, 100–106, 110–116, and 120–126 is not propagated when the modular polynomial-basis multiplications algorithm is being computed. The letter "A" has been appended to the reference number of the AND-gates to signify that each adder, such as adder 90, has a corresponding AND-gate, i.e., 90A, that either passes or blocks the carry output of that adder from being transferred to the carry input of an adjacent adder.

Further, the second inputs of AND-gates 89, 101, 113, and 125 are commonly connected to each other and to input terminal 81. The second inputs of AND-gates 91, 103, and 115 are commonly connected to each other, to an input of a latch 158, and to input terminal 83. The second inputs of AND-gates 93 and 105 are commonly connected to each other, to an input of a latch 154, and to input terminal 85. The second input of AND-gate 95 is commonly connected to an input of a latch and to input terminal 87. The second inputs of AND-gates 99, 111, and 123 are commonly connected to each other and to an output of latch 150. The second inputs of AND-gates 109 and 121 are commonly connected to each other and to an output of latch 154. The second input of AND-gate 119 is connected to an output of latch 158.

Latches 128, 132, 136, and 140 each have a set input (S), a reset input (R), and an output (Q). Latches 128, 132, 136, and 140 are enabled when signal T is high causing the signal at output Q to have the same value as the signal at input S. The signals at the Q outputs are latched when the signal T transitions from a high to a low logic value. The signal at input R resets the signals at the Q outputs. The reset inputs R of latches 128, 132, 136, and 140 are commonly connected to each other and to a terminal 79. Terminal 79 is coupled for receiving a reset signal R. A two input AND-gate 130 has an output connected to the set input of latch 128. The first input of AND-gate 130 is connected to the first input of adder 90. A two input AND-gate 134 has an output connected to the set input of latch 132. The first input of AND-gate 134 is connected to the first input of adder 102. A two input AND-gate 138 has an output connected to the set input of latch 136. The first input of AND-gate 138 is connected to the first input of adder 114. A two input AND-gate 142 has an output connected to the set input of latch 140. The first input of AND-gate 142 is connected to the first input of adder 126. The second inputs of AND-gates 130, 134, 138, and 142 are commonly connected to each other and to terminal 78. Terminal 78 is coupled for receiving a signal T.

Large operands such as, for example, two 1024 bit operands are multiplied using pipelining techniques and multiple passes or rotations through a multiplier (not shown). Typically, the larger operands A and B are segmented into smaller groups that are referred to as digits, e.g., digits $A_0$–$A_N$ and $B_0$–$B_N$. The pipelined multiplier has an array size that is appropriate for multiplying the digits. By way of example, the digits $A_0$–$A_N$ and $B_0$–$B_N$ are 16 bit binary numbers and the multiplier is a 16 bit multiplier, although this is not a limitation of the present invention.

In general, integer-modulo-N Montgomery multiplications take the form of:

(A*R mod N)(B*R mod N)+μ*N where:

A is the first operand and an integer;
B is the second operand and an integer;

N is an integer having an odd value;
mod N is a remainder value of (A*B*R)/N that defines the number of elements in the finite field;
R is an integer power of two number having a value greater than the value of N; and
μ is a reduction value that is computed such that (A*R mod N)(B*R mod N)+μ*N is an integer that can be divided by R without a loss of significant bits.

In operation, modulo reducer 60 receives the product of (A*R mod N) and (B*R mod N) and generates reduced partial product outputs for integer-modulo-N multiplications. For simplicity and illustrative purposes integer-modulo-N multiplications are described using the following example for four-bit numbers. Referring to FIG. 3, input terminals 80, 82, 84, and 86 receive the respective product terms $P_{i+0}$, $P_{i+1}$, $P_{i+2}$, and $P_{i+3}$ that result from multiplying operands such as, for example, operands $A_0$ and $B_0$. In addition, input terminals 81, 83, 85, and 87 receive the values $N_{i+0}$, $N_{i+1}$, $N_{i+2}$, and $N_{i+3}$, i.e., values for the integer N. Modulo reducer 60 generates a reduced product term for modular multiplication at output terminals 164–170.

Modulo reducer 60 implements the Foster-Montgomery Reduction Algorithm. In the Foster-Montgomery Reduction Algorithm the logic values at particular bit locations determine whether the value of N is aligned and added to a summed value. The architecture of modulo reducer 60 allows the value of N to both be aligned and added to the summed value when the logic value at a particular bit location has a logic one value. By aligning and adding the value of N, the value of μ is determined and stored in latches 128, 132, 136, and 140. In other words, the value of μ is determined during the reduction process that generates the reduced product term at output terminals 164–170 and not prior to the multiplication of digits $A_0$ and $B_0$.

An example is described where the term (A*R mod N) has the value of 0001 when using base two numbers and $A_{10}$=9, $R_{10}$=16, and $N_{10}$=13. Further, the term (B*R mod N) has the value of 0111 when $B_{10}$=11, $R_{10}$=16, and $N_{10}$=13. Note that operands $A_0$ and $B_0$ are pre-multiplied by R for Montgomery multiplication to simplify a hardware modular reduction problem. When the operands (A*R mod N) and (B*R mod N) are multiplied, the product terms, $P_{i+3}$, $P_{i+2}$, $P_{i+1}$, and $P_{i+0}$ have the respective value of 0111.

Initially, a reset signal at terminal 79 causes the Q outputs of latches 128, 132, 136, and 140 to have logic zero values. AND-gate 130 receives the product term $P_{i+}$ having a logic one value, at one input and the signal T, having a logic one value, at the other input. The output of AND-gate 130 generates a logic one value that causes latch 128 to set, i.e., the signal at the Q output has a logic one value. It should be noted that the signal T has a logic one value during the time that operands $A_0$ and $B_0$, i.e., the lower order digits of operands A and B, are multiplied together. It should be further noted that the logic one value at the Q output of latch 128 causes AND-gates 89, 91, 93, and 95 to be enabled and pass the values $N_{i+0}$, $N_{i+1}$, $N_{i+2}$, and $N_{i+3}$ to the second inputs of adders 90, 92, 94, and 96, respectively. Thus, the adders located in column $X_0$ generate output signals that are the sum of the values $N_{i+0}$, $N_{i+1}$, $N_{i+2}$, and $N_{i+3}$ and the corresponding values of $P_{i+0}$, $P_{i+1}$, $P_{i+2}$, and $P_{i+3}$.

The logic one values at the first and second inputs of adder 90 cause output S to supply a logic zero value. Further, adder 90 generates a carry signal at output CO. Adder 92 receives a logic one value at the first input, a logic zero value at the second input, and a logic one value for the carry signal at input CI. The signal at output S of adder 92 has a logic zero value and the carry signal at output CO has a logic one value.

Adder 94 receives a logic one at the first input, a logic one at the second input from AND-gate 93, and a carry signal enabled through AND-gate 92A. The output S of adder 94 has a logic one value and the carryout signal has a logic one value at the carry output CO. Likewise, adder 96 receives a logic zero at the first input, a logic one at the second input from AND-gate 95, and a carry signal enabled through AND-gate 94A. The output signal at output S of adder 96 has a logic zero value and the carry signal at the carry output CO has a logic one value. In accordance with the Foster-Montgomery Reduction Algorithm, the particular bit location having a logic one value, i.e., the least significant bit location at input terminal 80, causes the value N to be aligned and added to the value P.

Again, according to the Foster-Montgomery Reduction Algorithm, the data generated by the adders in column $X_1$ have values that depend on the data at a particular data bit location. The particular data bit location in this instance corresponds with the output S of adder 92. It should be noted that an input of AND-gate 134 receives a logic zero value from the signal at output S of adder 92. Latch 132 is not set and the Q output of latch 132 remains a logic zero value. AND-gates 99, 101, 103, and 105 generate a logic zero value at the second inputs of adders 100, 102, 104, and 106, respectively. Adder 100 has logic zero values at both the first and second inputs and generates a logic zero value at output S. Likewise, adder 102 has logic zero values at both the first and second inputs and generates a logic zero value at output S. Adder 104 has a logic one value at the first input and a logic zero value at the second input and generates a logic one value at output S. Adder 106 has logic zero values at both the first and second inputs and generates a logic zero value at output S. Thus, adders 106, 104, 102, and 100 in column $X_1$ generate a respective value of 0100.

The data generated by the adders in column $X_2$ have values that also depend on the data at a particular data bit location. The particular data bit in this instance is the logic value at the output of adder 104. It should be noted that an input of AND-gate 138 receives a logic one value from the signal at output S of adder 104. The logic one value at the output of AND-gate 138 causes latch 136 to set and the Q output of latch 136 to have a logic one value. AND-gates 109, 111, 113, and 115 are enabled by the logic one value generated by latch 136. Thus, the data at the outputs of adders 100, 102, 104, and 106 is transferred to the second inputs of adders 110, 112, 114, and 116, respectively. Adder 110 has logic zero values at both the first and second inputs and generates a logic zero value at output S. Likewise, adder 112 has logic zero values at both the first and second inputs and generates a logic zero value at output S. Adder 114 has logic one values at both the first and second inputs and generates a logic zero value at output S and a logic one value for the carryout signal at output CO. Adder 116 has logic zero values at both the first and second inputs and a logic one value is transferred through AND-gate 114A to the carry input of adder 116. A logic one value is generated at output S of adder 116. Thus, adders 116, 114, 112, and 110 in column $X_2$ generate a respective value of 1000.

The data generated by adders 120, 122, 124, and 126 in column $X_3$ have values that also depend on the data at a particular data bit location. The particular data bit in this instance is the logic value at the output of adder 116. An input of AND-gate 142 receives a logic one value from the signal at output S of adder 116. And gate 142 having a logic one value from adder 116 and a logic one value for the signal T causes latch 140 to set. The Q output of latch 140 has a logic one value which enables AND-gates 119, 121, 123, and 125. The data at the outputs of adders 110, 112, 114, and 116 is transferred to the first inputs of adders 120, 122, 124, and 126, respectively. Adder 120 has logic zero values at both the first and second inputs and generates a logic zero value at output S. Likewise, adder 122 has logic zero values at both the first and second inputs and generates a logic zero value at output S. Adder 124 also has logic zero values at both the first and second inputs and generates a logic zero value at output S. Adder 126 has logic one values at both the first and second inputs and generates a logic zero value at output S and a logic one value as the carryout signal at the carry output. Thus, adders 126, 124, 122, and 120 in column $X_3$ generate a respective value of 0000 at output terminals 164–170.

During the reduction process that causes the first partial product of $A_0$ and $B_0$ to have a value of zero, the appropriate latches 128, 132, 136, and 140 have been set and contain the value 1101 for $\mu$ that is used in subsequent pipelined multiplications. Following the reduction of the first partial product to zero, the signal T transitions from a logic one to a logic zero value and stores the value of $\mu$ in latches 128, 132, 136, and 140. The stored value of $\mu$, the next digit of N, and the products of the digits $B_1$–$B_{63}$ with $A_1$–$A_{63}$ are used by modulo reducer 60 to complete the polynomial multiplication.

Figure 4:
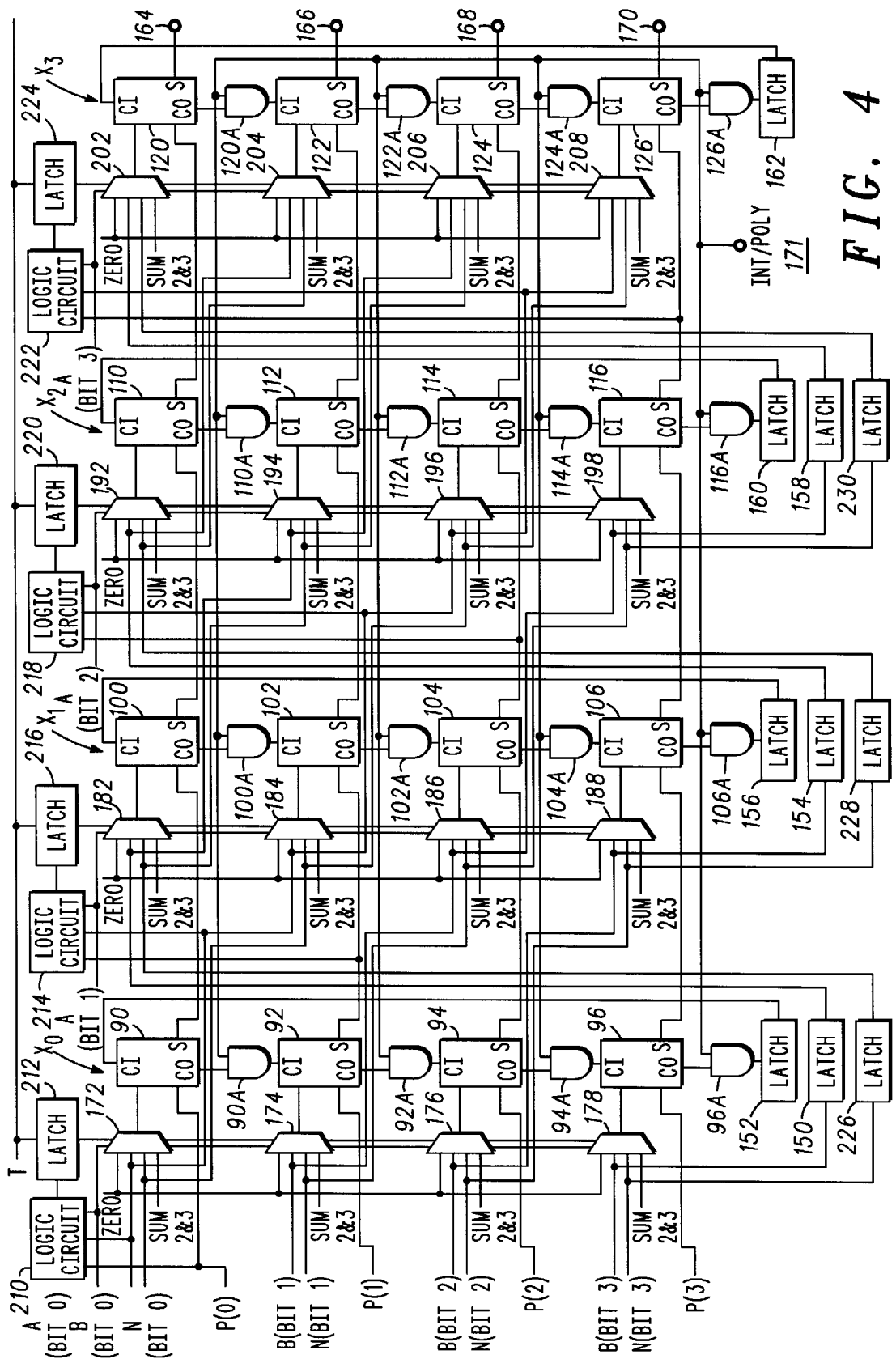
FIG. 4 is a schematic diagram showing another embodiment of a portion of the single processor of FIG. 2.

FIG. 4 is a schematic diagram showing a multiplier structure 171 as a portion of another embodiment of single arithmetic processor 22 of FIG. 2. Multiplier structure 171 performs mathematical operations in support of integer-modulo-N multiplications and modular polynomial-basis multiplications. Multiplier structure 171 is described in simplified form for simplicity and illustrative purposes as being a four by four array of adders. Although multiplier structure 171 is described as an array of adders having the same number of rows and columns, this is not a limitation of the present invention.

Multiplier structure 171 has adders 90, 92, 94, and 96 in column $X_0$, adders 100, 102, 104, and 106 in column $X_1$, adders 110, 112, 114, and 116 in column $X_2$, and adders 120, 122, 124, and 126 in column $X_3$. In addition, latches 152, 156, 160, and 162 store carryout signals that are used in computing integer-modulo-N multiplications for generating the next partial product. Latches 150, 154, and 158 store data bits of operand B, and latches 226, 228, and 230 store data bits of the value N for use in generating the next partial product.

The multiplexers (muxes) in multiplier structure 171 each have four inputs, an output, and two selector inputs. Multiplexers 172–178, 182–188, 192–198, and 202–208 are illustrated as having outputs connected to the first input of the adders, although, it should be noted that the outputs of the multiplexers could be connected to the second inputs of the adders. The signals on the first and second selector inputs of the muxes select a signal at one of the four mux inputs for transfer to the mux output. The output signals from muxes 172–178 are transferred to the first input of adders 90–96, respectively. The output signals from muxes 182–188 are transferred to the first input of respective adders 100–106. The output signals from muxes 192–198 are transferred to the first input of adders 110–116, respectively. The output signals from muxes 202–208 are transferred to the first input of adders 120–126, respectively.

Further, the first selector inputs of muxes 172–178 are commonly connected to each other and receive the signal $A_{(BIT\ 0)}$. The second selector inputs of muxes 17–178 are commonly connected to each other and to an output of a latch 212. The first selector inputs of muxes 182–188 are commonly connected to each other and receive the signal $A_{(BIT\ 1)}$. The second selector inputs of muxes 182–188 are commonly connected to each other and to an output of a latch 216. The first selector inputs of muxes 192–198 are commonly connected to each other and receive the signal $A_{(BIT\ 0)}$. The second selector inputs of muxes 192–198 are commonly connected to each other and to an output of a latch 220. The first selector inputs of muxes 202–208 are commonly connected to each other and receive the signal $A_{(BIT\ 3)}$. The second selector inputs of muxes 202–208 are commonly connected to each other and to an output of a latch 224.

A first input of muxes 172–178, 182–188, 192–198, and 202–208 is commonly coupled for receiving a logic zero value. The second input of muxes 172, 174, 176, and 178 receive the respective values $B_{(BIT\ 0)}$, $B_{(BIT\ 1)}$, $B_{(BIT\ 2)}$, and $B_{(BIT\ 3)}$. The third inputs of muxes 172, 174, 176, and 178 receive the respective values of $N_{(BIT\ 0)}$, $N_{(BIT\ 1)}$, $N_{(BIT\ 2)}$, and $N_{(BIT\ 3)}$. The fourth inputs of muxes 172, 174, 176, and 178 receive the summed value of the respective values for N and B. Thus, the fourth input of each mux receives the logical summed value of the values supplied at the second and third inputs of that mux.

When the first and second selector inputs of the muxes receive respective logic values of 00, the signals at the first inputs of muxes 172–178, 182–188, 192–198, and 202–208 are transferred to the outputs of the corresponding muxes. When the first and second selector inputs receive respective logic values of 01, the signals at the second inputs of muxes 172–178, 182–188, 192–198, and 202–208 are transferred to the outputs of the corresponding muxes. When the first and second selector inputs receive respective logic values of 10, the signals at the third inputs of muxes 172–178, 182–188, 192–198, and 202–208 are transferred to the outputs of the corresponding muxes. When the first and second selector inputs receive respective logic values of 11, the signals at the fourth inputs of muxes 172–178, 182–188, 192–198, and 202–208 are transferred to the outputs of the corresponding muxes.

Latches 212, 216, 220, and 224 latch a data signal from respective logic circuits 210, 214, 218, and 222 when the signal T transitions from a logic one to a logic zero value. The data signal generated by logic circuit 210 is the product of the signals A(BIT 0) and B(BIT 0) exclusive or'ed with P(0), where P(0) is the least significant bit of the previous partial product value. The data signal generated by logic circuit 214 is the product of the signals A(BIT 1) and B(BIT 0) exclusive or'ed with the output signal from adder 92. The data signal generated by logic circuit 218 is the product of the signals A(BIT 2) and B(BIT 0) exclusive or'ed with the output signal from adder 104. The data signal generated by logic circuit 222 is the product of the signals A(BIT 3) and B(BIT 0) exclusive or'ed with the output signal from adder 116.

AND-gates 90A–96A are located in the carry chain path of the adders in column $X_0$. Thus, AND-gates 90A–96A either enable or disable signals from propagating in the carry chain of column $X_0$. Likewise, AND-gates 100A–106A are located in the carry chain path of the adders in column $X_1$ and either enable or disable signals from propagating in the carry chain of column $X_1$. AND-gates 110A–116A are located in the carry chain path of the adders in column $X_2$ and either enable or disable signals from propagating in the carry chain of column $X_2$. AND-gates 120A–126A are located in the carry chain path of the adders in column $X_3$ and either enable or disable signals from propagating in the carry chain of column $X_3$. Each AND-gate 90A–96A, 100A–106A, 110A–116A, and 120A–126A is enabled when multiplier structure 171 is computing integer-modulo-N multiplications and disabled when multiplier structure 171 is computing modular polynomial-basis multiplications. In other words, the carry chain paths of multiplier structure 171 only propagate carry chain signals to adjacent adder cells when integer-modulo-N multiplications are being computed.

The multiplication process that generates the partial product of digits $A_0$ and $B_0$ causes the logic values at output terminals 164–170 to be reduced. Thus, the partial product that results from digit $A_0$ times digit $B_0$ has all logic zero values. In addition, latches 128, 132, 136, and 140 have been appropriately set and store the value for p during the multiplication of $A_0$ and $B_0$. During subsequent multiply operations, the stored value of $\mu$, along with corresponding values of $N_1$–$N_{63}$, digits $B_1$–$B_{63}$, and digits $A_1$–$A_{63}$ are used by multiplier structure 171 to complete the mathematical computations for integer-modulo-N multiplications.

Referring to FIG. 4, the following example uses the arithmetic process for modular polynomial multiplication. The Montgomery Reduction Algorithm for polynomial multiplication takes the form of:

$$(A*R \bmod N)(B*R \bmod N) + \mu*N$$

where:
  A is the first operand and a polynomial;
  B is the second operand and a polynomial;
  N is an irreducible polynomial;
  mod N is a remainder value of (A*B*R)/N that defines the number of elements in the finite field;
  R is an integer power of two number having a value greater than the value of N; and
  $\mu$ is a reduction value that is computed such that $(A*R \bmod N)(B*R \bmod N) + \mu*N$ is an integer that can be divided by R without a loss of significant bits.

An example is described where the term (A*R mod N) has the value of $(x^6+x^4)$ mod N=x+1 or 011 when using base two numbers and A=5 (base ten) or $(x^2+1)$ in polynomial form, R=16 (base ten) or $(x^4)$ in polynomial form, and N=11 (base ten) or $(x^3+x+1)$ in polynomial form. Further, the term (B*R mod N) has the value of 101 or $(x^6)$ mod N $x^2+1$ in polynomial form when B=4 (base ten), R=16 (base ten), and N=11 (base ten). Note that digits $A_0$ and $B_0$ are pre-multiplied by R to simplify a hardware modular reduction problem. When the operands (A*R mod N) and (B*R mod N) are multiplied, the product terms, $P_{i+3}$, $P_{i+2}$, $P_{i+1}$, and $P_{i+0}$ have the respective value of 1111. Multiplier structure 171 reduces the product of [(A*R mod N) * (B*R mod N)] mod N by R, which results in a value of 0111 or $(x^2+x+1)$ in polynomial form.

Initially, a reset signal at terminal 79 causes the Q outputs of latches 128, 132, 136, and 140 to have logic zero values. AND-gate 130 receives the product term $P_{i+0}$, having a logic one value, at one input and the signal T, having a logic one value, at the other input. The output of AND-gate 130 generates a logic one value that causes latch 128 to set, i.e., the signal at the Q output has a logic one value. It should be noted that the signal T has a logic one value during the time that digits $A_0$ and $B_0$, i.e., the lower order segment of operands A and B, are multiplied together. It should be further noted that the logic one value at the Q output of latch 128 causes AND-gates 89, 91, 93, and 95 to be enabled and pass the values $N_{i+0}$, $N_{i+1}$, $N_{i+2}$, and $N_{i+3}$ to the second inputs of adders 90, 92, 94, and 96, respectively. Thus, the adders located in column $X_0$ generate output signals that are the sum of the values $N_{i+0}$, $N_{i+1}$, $N_{i+2}$, and $N_{i+3}$ and the corresponding values of $P_{i+0}$, $P_{i+1}$, $P_{i+2}$, and $P_{i+3}$.

The logic one values at the first and second inputs of adder 90 cause output S to supply a logic zero value. Further, adder 90 generates a carry signal at output CO. Adder 92 receives a logic one value at the first input, a logic one value at the second input, and a logic zero value for the carry signal at input CI (AND-gate 90A blocks the carry signal generated by adder 90 from propagating to adder 92). The signal at output S of adder 92 has a logic zero value and the carry signal at output CO has a logic one value. It should be noted that AND-gate 92A blocks the carry signal generated by adder 92 from propagating to adder 94.

Adder 94 receives a logic one at the first input, a logic zero at the second input from AND-gate 93, and a logic zero for the carry signal. The output S of adder 94 has a logic one value and the carryout signal has a logic zero value at the carry output CO. Likewise, adder 96 receives a logic one at the first input, a logic one at the second input from AND-gate 95, and a logic zero value for the carry signal. The output signal at output S of adder 96 has a logic zero value and the carry signal at the carry output CO has a logic one value. In accordance with the Foster-Montgomery Reduction Algorithm, the particular bit location having a logic one value, i.e., the least significant bit location at input terminal 80, causes the value N to be aligned and added to the value P.

According to the Foster-Montgomery Reduction Algorithm, the data generated by the adders in column $X_1$ have values that depend on the data at a particular data bit location. The particular data bit location in this instance corresponds with the output S of adder 92. It should be noted that an input of AND-gate 134 receives a logic zero value from the signal at output S of adder 92. Latch 132 is not set and the Q output of latch 132 remains a logic zero value. AND-gates 99, 101, 103, and 105 generate logic zero values at the second inputs of adders 100, 102, 104, and 106, respectively. Adder 100 has logic zero values at both the first and second inputs and generates a logic zero value at output S. Likewise, adder 102 has logic zero values at both the first and second inputs and generates a logic zero value at output S. Adder 104 has a logic one value at the first input and a logic zero value at the second input and generates a logic one value at output S. Adder 106 has logic zero values at both the first and second inputs and generates a logic zero value at output S. Thus, adders 106, 104, 102, and 100 in column $X_1$ generate a respective value of 0100.

The data generated by the adders in column $X_2$ have values that also depend on the data at a particular data bit location. The particular data bit location in this instance corresponds with the output S of adder 104. It should be noted that an input of AND-gate 138 receives a logic one value from the signal at output S of adder 104. The logic one value at the output of AND-gate 138 causes latch 136 to set and the Q output of latch 136 to have a logic one value. AND-gates 109, 111, 113, and 115 are enabled by the logic one value generated by latch 136. Thus, the data at the outputs of adders 100, 102, 104, and 106 is transferred to the second inputs of adders 110, 112, 114, and 116, respectively. Adder 110 has logic zero values at both the first and second inputs and generates a logic zero value at output S. Likewise, adder 112 has logic zero values at both the first and second inputs and generates a logic zero value at output S. Adder 114 has logic one values at both the first and second inputs and generates a logic zero value at output S and a logic one value for the carryout signal at output CO. The logic one value for the carryout signal is inhibited by AND-gate 114A from propagating to adder 116. Adder 116 has logic zero value at the first input, a logic one value at the second input, and a logic zero value for the carry input. A logic one value is generated at output S of adder 116. Thus, adders 116, 114, 112, and 110 in column $X_2$ generate a respective value of 1000.

The data generated by adders 120, 122, 124, and 126 in column $X_3$ have values that also depend on the data at a particular data bit location. The particular data bit location in this instance corresponds with the output S of adder 116. An input of AND-gate 142 receives a logic one value from the signal at output S of adder 116. And gate 142 having a logic one value from adder 116 and a logic one value for the signal T causes latch 140 to set. The Q output of latch 140 has a logic one value which enables AND-gates 119, 121, 123, and 125. The data at the outputs of adders 110, 112, 114, and 116 is transferred to the first inputs of adders 120, 122, 124, and 126, respectively. Adder 120 has logic zero values at both the first and second inputs and generates a logic zero value at output S. Likewise, adder 122 has logic zero values at both the first and second inputs and generates a logic zero value at output S. Adder 124 also has logic zero values at both the first and second inputs and generates a logic zero value at output S. Adder 126 has logic one values at both the first and second inputs and generates a logic zero value at output S and a logic one value as the carryout signal at the carry output. AND-gate 126A inhibits the carryout signal from propagating to a latch 162. Thus, adders 126, 124, 122, and 120 in column $X_3$ generate a respective value of 0000 at output terminals 164–170.

During the reduction process that occurs in the first multiplication cycle, the first N bits of the partial product of digits $A_0$ and $B_0$ are reduced to having values of zero. Latches 128, 132, 136, and 140 have been set and contain the value for $\mu$ of 1101 that is used in subsequent pipelined multiplications for determining the product of operands A and B. Following the reduction of the first partial product to zero, the signal T transitions from a logic one to a logic zero value and stores the value of $\mu$ in latches 128, 132, 136, and 140. The stored value of $\mu$, a value for $N_{(i+3)}$, $N_{(i+2)}$, $N_{(i+1)}$, and $N_{(i+0)}$ of 0000, and a value for $P_{(i+3)}$, $P_{(i+2)}$, $P_{(i+1)}$, and $P_{(i+0)}$ of 0000 are used by multiplier structure 171 to complete the polynomial reduction process. The signals at output terminals 170, 168, 166, and 164 have a respective value of 0111, e.g. a value represented as $(x^2+x+1)$ in polynomial form, after the second multiplication cycle has completed.

Briefly referring to FIG. 4, the modular polynomial multiplication of (A*R mod N) and (B*R mod N) produces the same binary product as found using the circuitry of FIG. 3. When calculating modular polynomial-basis multiplications, AND-gates 90A–96A, 100A–106A, 110A–116A, and 120A–126A are not enabled. Therefore, adders 90–96, adders 100–106, adders 110–116, and adders 120–126 do not propagate a carryin signal to adjacent adder cells. The disabled AND-gates cause a logic zero value to be supplied at each of the CI terminals.

During the first multiplication cycle, the reduction process causes a value of 0000 to be generated as the first partial product of digits $A_0$ and $B_0$ at output terminals 170, 168, 166, and 164. In addition, latches 224, 220, 216, and 212 are set during the generation of the first partial product and the latches retain the value for $\mu$ of 1101 that is used in subsequent pipelined multiplications. During the second multiplication cycle, the signals generated at output terminals 170, 168, 166, and 164 have a respective binary value of 0111 or a value of $(x^2+x+1)$ in polynomial form.

It should be noted that the architecture of multiplier structure 171 allows the value of $\mu$ to be determined and stored in latches 212, 216, 220, and 224. In other words, the value of $\mu$ is not calculated prior to the multiplication of the operands A and B, but rather the value of $\mu$ is determined and latched during the cycle that determines the multiplication of the digits $A_0$ and $B_0$. The latched value of $\mu$ is used during the multiplication of the other digits in the pipelined process that determine the full product of the operands A and B.

Figure 5:
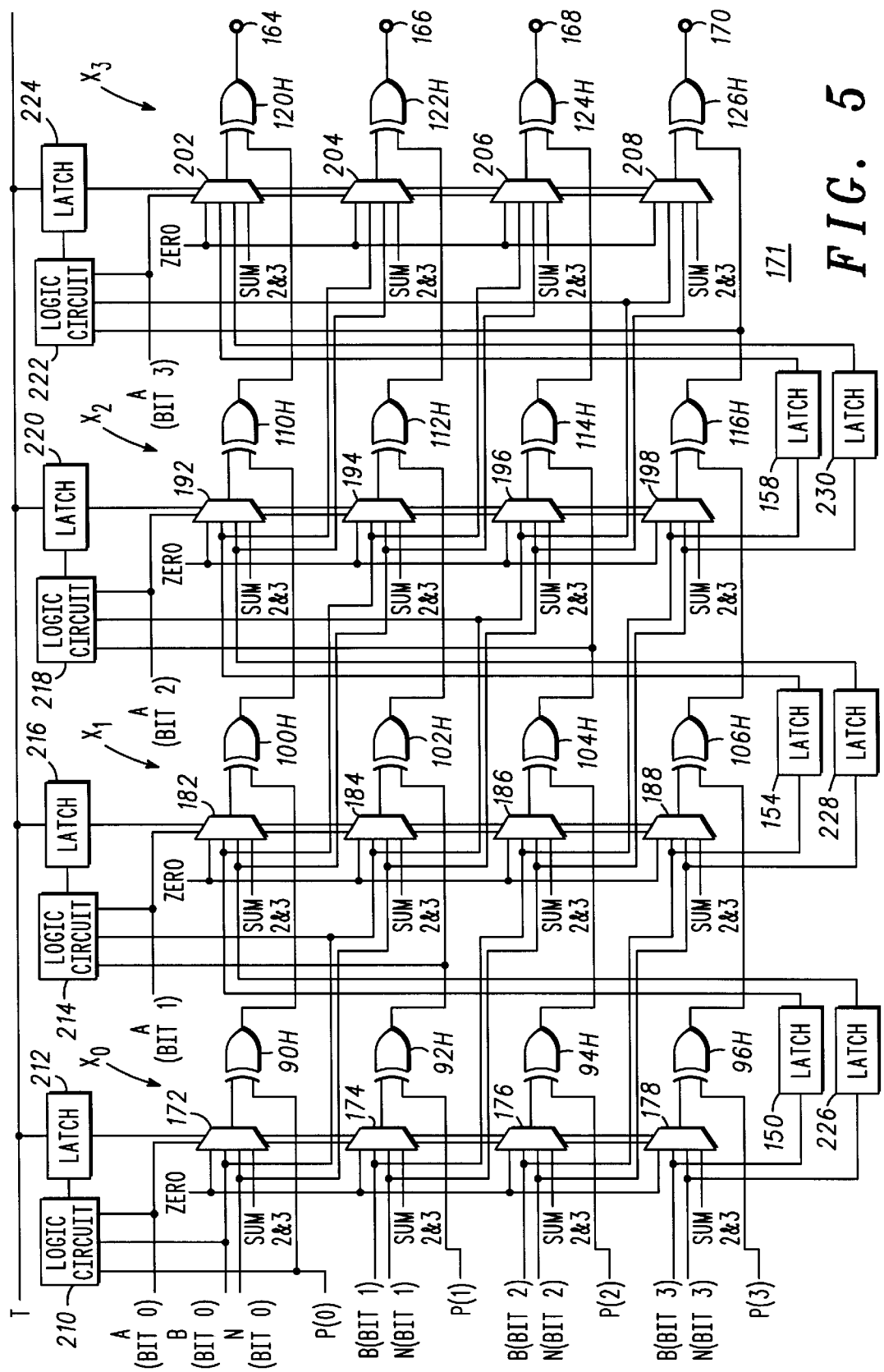
FIG. 5 is a schematic diagram showing a portion of a multiplier for computing the ECC algorithm ($F2^M$ in the polynomial basis)

FIG. 5 is a schematic diagram showing a portion of a multiplier 232 for computing modular polynomial-basis multiplications. Briefly referring to FIG. 4, AND-gates 90A–96A, 100A–106A, 110A–116A, and 120A–126A are not enabled when multiplier structure 171 is used for computing modular polynomial-basis multiplications. Therefore, adder cells do not receive a carryin signal from the carryout (CO) terminal of an adjacent adder cell. Accordingly, the full adder cell of adders 90–96, 100–106, 110–116, and 120–126 can be replaced by a half adder cell as illustrated in FIG. 5. The letter "H" has been appended to the reference number of the exclusive-OR gates used as the half adder cells.

For the example where (A*R mod N)=$(x^6+x^4)$ mod N, (B*R mod N)=$(x^6)$ mod N, A=$(x^2+1)$, B=$(x^2)$, R=$(x^4)$, and N=$(x^3+x+1)$, the polynomial multiplication of (A*R mod N) and (B*R mod N) produces a value of 0000 at the respective output terminals 170, 168, 166, and 164 during the first multiplication cycle. Thus, the first partial product is reduced to zero and the value of $\mu$ is determined as having a value of 1101 and stored in respective latches 224, 220, 216, and 212. The stored value of $\mu$ is used during subsequent multiplication cycles that generate the full product of operands A and B. The signals at output terminals 170, 168, 166, and 164 have a respective binary value of 0111, e.g., a value of $(x^2+x+1)$ in polynomial form during the second multiplication cycle.

Figure 6:
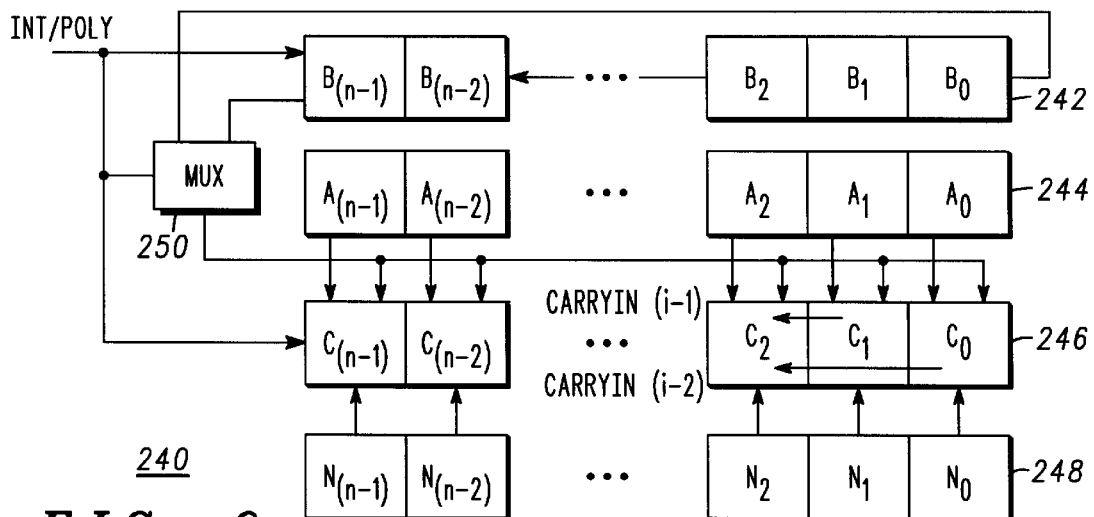
FIG. 6 is a block diagram that illustrates a 1×N multiplier for computing either the RSA or the ECC algorithm.

FIG. 6 is a block diagram that illustrates a 1×M multiplier 240 for computing either integer-modulo-N multiplications or modular polynomial-basis multiplications, where M is the number of multiplier cells. Multiplier 240 has a B-register 242 for storing operand B, an A-register 244 for storing operand A, a C-register 246 for computing and storing a product value, and an N-register 248 for storing a value of N. Although a reset line is not shown, C-register 246 is initially cleared prior to the first multiplication cycle. It should be noted that N-register 248 stores a binary value having an odd integer value when multiplier 240 computes integer-modulo-N multiplications and a binary value for an irreducible polynomial when multiplier 240 computes modular polynomial-basis multiplications. Registers 242–248 are illustrated in FIG. 6 as M-bit wide registers.

B-register 242, in the preferred embodiment, is a shift register that shifts the data stored in that register either to the left or to the right. By way of example, B-register 242 shifts data to the right when multiplier 240 computes integer-modulo-N multiplications, i.e., data-bits of B-register 242 are transferred to mux 250 starting with the least-significant data-bits of B-register 242. On the other hand, B-register 242 shifts data to the left when multiplier 240 computes modular polynomial-basis multiplications, i.e., data-bits of B-register 242 are transferred to mux 250 starting with the most-significant data-bits of B-register 242. The clock signals used to latch values in B-register 242, A-register 244, C-register 246, and N-register 248 are not shown in FIG. 6. Also, the bus lines connected to inputs and outputs of each register that allow data to be transferred to and retrieved from the registers are not shown.

Multiplier 240 computes either integer-modulo-N multiplications or modular polynomial-basis multiplications based on the logic state of the signal at the INT/POLY input.

Figure 7:
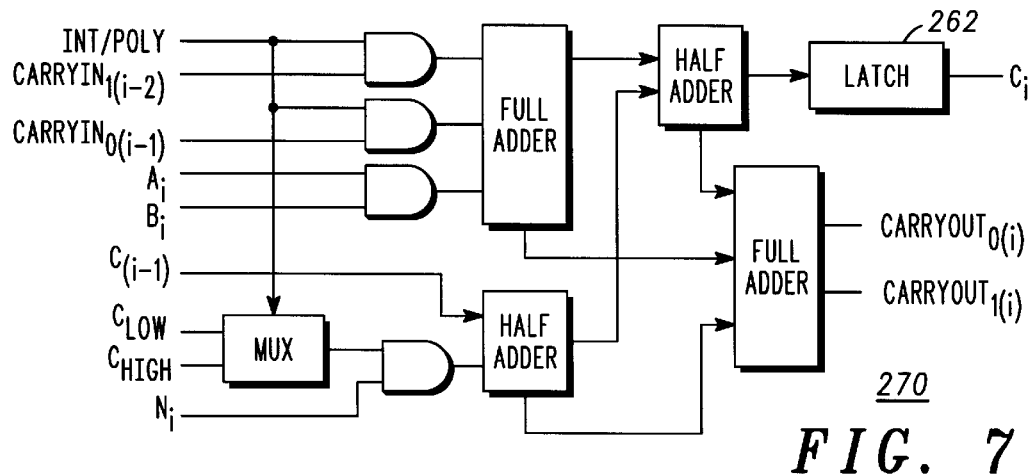
FIG. 7 is a schematic diagram of a cell used in the C-register of the multiplier of FIG. 6 for single-cycle multiplication operations.
Figure 8:
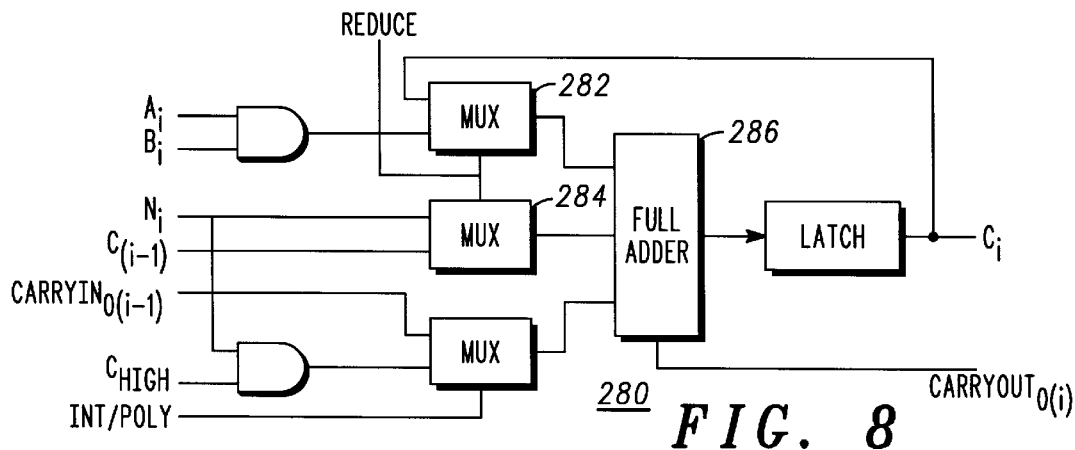
FIG. 8 is a schematic diagram of another cell used in the C-register of the multiplier of FIG. 6 for two-cycle multiplication operations.

The INT/POLY input is connected to the select input of a multiplexer (mux) 250, to B-register 242, and to an input of the adder cells of C-register 246 (see input INT/POLY in FIGS. 7 and 8). Thus, when the signal at the INT/POLY input causes multiplier 240 to compute modular polynomial-basis multiplications, B-register 242 operates to shift data to the left, presenting the data from the most significant data-bit position of B-register 242 through mux 250 to inputs of C-register 246. When multiplier 240 computes integer-modulo-N multiplications, B-register 242 operates to shift data to the right, presenting the data from the least significant data-bit position of B-register 242 through mux 250 to inputs of C-register 246.

FIG. 7 is a schematic diagram of a cell 270 that is used in C-register 246 of multiplier 240 (FIG. 6) for single-cycle multiplication operations. Although multiplier 240 is illustrated as a ripple-carry multiplier, it should be understood that multiplier 240 could be implemented as a carry-save multiplier. Thus, cells $C_{(n-1)}$, $C_{(n-2)}$, . . . , and $C_0$ of C-register 246 incorporate cell 270 in computing modular polynomial-basis and integer-modulo-N multiplications. A logic zero at the input INT/POLY of cell 270 causes cell 270 to compute the modular polynomial-basis. Latch 262 in cell 270 latches the "ith" bit, storing the value $(A_i*B_i \oplus N_i*C_{HIGH} \oplus CARRYIN_{(i-1)})$, where $A_i$, $B_i$, and $N_i$ are values stored at a particular bit location (designated as bit location i) of A-register 244, B-register 242, and N-register 248, respectively. $C_{HIGH}$ is the value of the most significant data bit that is stored in C-register 246. $C_{(i1)}$ is the previous partial product value that is stored in the register cell that is adjacent to the "ith" bit in C-register 246.

On the other hand, when multiplier 240 is selected for computing integer-modulo-N multiplications, latch 262 of cell 270 latches the value of $(A_i*B_i \oplus CARRYIN_{(i-1)} \oplus CARRYIN_{(i-2)} \oplus C_{(i-1)} \oplus N_i*C_{LOW})$, where $A_i$, $B_i$, and $N_i$ are values stored at the "ith" bit location of A-register 244, B-register 242, and N-register 248, respectively. $C_{LOW}$ is the value of the least significant data bit that is stored in C-register 246. $CARRYIN_{(i-1)}$ is the carry signal that propagates from the adder cell that is adjacent to the "ith" bit in C-register 246. $CARRYIN_{(i-2)}$ is the carry signal propagated from an adder cell that is two cells removed from the "ith" bit in C-register 246. $C_{(i-1)}$ is a previous partial product value that is stored in a latch that is adjacent to the "ith" bit in C-register 246.

In operation, the multiplication of operand A by operand B in integer form for integer-modulo-N multiplications is accomplished in multiple multiplication cycles. Data is shifted from B-register 242, one data bit each multiplication cycle, to C-register 246. Thus, C-register 246 performs the multiplication of operands A and B and reduces that product by multiples of N to generate the value $(A*B*R^{-1} \bmod N)$. Thus, in the first multiplication cycle, the least significant data bit of operand B is shifted through mux 250 to C-register 246. In the next multiplication cycle, the shift right operation of B-register 242 causes the next least significant data bit to be transferred through mux 250 to C-register 246. The multiplication process continues until B-register 242 has shifted the stored value of operand B though mux 250, one data bit per multiplication cycle, to C-register 246 and C-register 246 generates the product (A*B*R mod N).

It should be noted that the multiplication of operand A, having the form (A*R mod N), with operand B, also having the form (B*R mod N), generates the product (A*B*R mod N) in reduced form. In other words, the product is reduced by R. By way of example, the (A*R mod N) term having a value of 10110 is stored in A-register 244, the (B*R mod N) term having a value of 10101 is stored in B-register 242, and the N term having a value of 11101 is stored in N-register 248. Initially, C-register 246 is cleared, causing the previous partial product $C_{(i-1)}$ to have a value of zero. In this example, multiplier 240 generates the product (A*B*R mod N) having the value (1001).

Specifically, the first partial product is generated by multiplying the value stored in A-register 244 by the least significant data bit from B-register 242. Thus, A-register 244 has a value (10110) that is multiplied by B(0), i.e., the least significant bit of B and a logic one value (1010<u>1</u>).

| | | |
|---|---|---|
| (1) | 10110 | <== value stored in A-register 244 |
| (2) | × 1010<u>1</u> | <== B(0), least significant bit of B |
| (3) | 10110 | <== first bit multiply |

Using the Foster-Montgomery Reduction Algorithm, the logic value of the data in a particular bit location of the partial product determines whether the value of N should be aligned and added to the partial product to reduce the value of the partial product for mod N. When the particular bit location has a logic zero value, then the value of N is not added to the partial product. On the other hand, the value of N is added to the partial product when the particular bit location has a logic one value. In this example, the particular bit location is the least significant bit of the first bit multiply (1011<u>0</u>). A logic zero value is in this location and accordingly, the value of N is not added to the first bit multiply (3).

The second bit multiply involves the multiplication of the value stored in A-register 244 by the next least significant bit from B-register 242. Thus, the value in A-register 244 (10110) is multiplied by B(1), i.e., the next least significant data bit of B and a logic zero value (101<u>0</u>1).

| | | |
|---|---|---|
| (1) | 10110 | <== value stored in A-register 244 |
| (4) | × 101<u>0</u>1 | <== B(1), next least significant bit |
| (5) | 00000 | <== second bit multiply result |

The product of the second bit multiply (5) is summed with the stored previous result (3) to generate the second partial product (6).

| | | |
|---|---|---|
| (5) | 00000 | <== second bit multiply |
| (3) | + 10110 | <== first partial product |
| (6) | 10110 | <== second partial product |

In the Foster-Montgomery Reduction Algorithm, the logic value of the particular bit location of the second partial product determines whether the second partial product should be reduced. In this case, the particular bit location is the location just to the left of the least significant data bit (101<u>1</u>0). The second data bit has a logic one value and accordingly, the value of N is aligned and added to the second partial product. In other words, the second partial product is reduced by the addition of N aligned at the particular bit location.

| | | |
|---|---|---|
| (6) | 10110 | <== second partial product |
| (7) | + 11101 | <== aligned value of N |
| (8) | 1010000 | <== reduced second partial product |

The third bit multiply involves the multiplication of the value stored in A-register 244 by the logic value of B(2), i.e., the value of the data bit located in the third bit location (10<u>1</u>01) from the right in B-register 242.

| | | |
|---|---|---|
| (1) | 10110 | <== value stored in A-register 244 |
| (9) | × 10<u>1</u>01 | <== B(2), next least significant bit |
| (10) | 10110 | <== third bit multiply result |

Following the third bit multiply, the product of the third bit multiply (10) is added to the previous result (8) to provide the third partial product (11).

| | | |
|---|---|---|
| (8) | 1010000 | <== previous result |
| (10) | + 10110 | <== third bit multiply |
| (11) | 10101000 | <== third partial product |

The logic value of the particular bit location of the third partial product determines whether the third partial product should be reduced. In this example, the particular bit location is the third bit location from the right (10101<u>0</u>00). The third data bit has a logic zero value and accordingly, the value of N is not aligned and added to the third partial product.

The fourth bit multiply involves the multiplication of the value stored in A-register 244 by the logic value of B(3), i.e., the value of the data bit located in the fourth bit location (1<u>0</u>101) from the right in B-register 242.

| | | |
|---|---|---|
| (1) | 10110 | <== value stored in A-register 244 |
| (12) | × 1<u>0</u>101 | <== B(3), next least significant bit |
| (13) | 00000 | <== fourth bit multiply result |

Following the fourth bit multiply, the fourth bit multiply result is added to the third partial product (11) to provide the fourth partial product (14).

| | | |
|---|---|---|
| (11) | 10101000 | <== third partial product |
| (13) | + 00000 | <== fourth bit multiply result |
| (14) | 10101000 | <== fourth partial product |

The logic value of the particular bit location of the fourth partial product determines whether the fourth partial product should be reduced. In this example, the particular bit location is the fourth bit location from the right (1010<u>1</u>000). The fourth data bit has a logic one value and accordingly, the value of N is aligned and added to the fourth partial product.

| | | |
|---|---|---|
| (14) | 10101000 | <== fourth partial product |
| (15) | + 11101 | <== aligned value of N |
| (16) | 110010000 | <== reduced fourth partial product |

The fifth bit multiply involves the multiplication of the value stored in A-register 244 by the logic value of B(4), i.e., the value of the data bit located in the fifth bit location (1̲0101) from the right in B-register 242.

| (1) | 10110 | <== value stored in A-register 244 |
|---|---|---|
| (17) | × 1̲0101 | <== B(4), next least significant bit |
| (18) | 10110 | <== fifth bit multiply result |

Following the fifth bit multiply, the fifth bit multiply result is added to the reduced fourth partial product (16) to provide the fifth partial product (19).

| (16) | 110010000 | <== reduced fourth partial product |
|---|---|---|
| (18) | + 10110 | <== fifth bit multiply result |
| (19) | 1011110000 | <== fifth partial product |

Again, the logic value of the particular bit location of the fifth partial product determines whether the fifth partial product should be reduced. In this example, the particular bit location is the fifth bit location from the right (10111̲0000). The fifth data bit has a logic one value and accordingly, the value of N is aligned and added to the fifth partial product.

| (19) | 1011110000 | <== fifth partial product |
|---|---|---|
| (20) | + 11101 | <== the value of N properly aligned |
| (21) | 10011000000 | <== reduced fifth partial product |

The product of (A*R mod N) and (B*R mod N), i.e., (10110) and (10101), has a value that is greater than the value of N. When the reduced final partial product has a value that is greater than N, then the value of N is subtracted from that final partial product. In other words, the value of N (11101) is aligned and subtracted from the reduced partial product (10011000000). It should be noted that the 1×N multiplier 240 has been used in computing the final product (A*B*R mod N) having a value of 1001.

The value of $\mu$ in the Foster-Montgomery Reduction Algorithm is not computed prior to the multiplication of the operands A and B but, as noted in the previous example, the value of $\mu$ is determined while the product of the digits $A_0$ and $B_0$ is being reduced. It should be noted that the value for N is odd, i.e., the value of N has a logic one value in the position for the least significant bit. Thus, by adding N to the summed value when the logic value of the particular bit location has a logic one value, the value (A*B*R mod N) is generated having a number of zeros in the lower bit locations. Put another way, the Foster-Montgomery Reduction Algorithm causes the least significant bit locations to have logic zero values in generating a product that is reduced by the value R.

Referring to FIGS. 6 and 7, the product (A*B) mod N can be generated to support ECC ($F2^M$ in the polynomial-basis), where A and B are finite field elements representing the coordinates of the elliptic curve and N is the irreducible or basis polynomial. The number of multiplication cycles required to generate the product depends, in part, on the number of bits stored in B-register 242. Data is shifted from B-register 242, one data bit at a time, to C-register 246. Thus, C-register 246 performs the multiplication of operands A and B and reduces that product by multiples of N in generating the value A*B mod N. Since a carry signal is not propagated between adder cells when multiplier 240 is computing modular polynomial-basis multiplications, the calculation of modular polynomial-basis multiplications can begin by multiplying the most significant data bit from A-register 244 with the most significant data bit from B-register 242. This eliminates the necessity of putting the operands into the Montgomery format, i.e., A→AR mod N. B-register 242 shifts data bits, starting with the most significant data bits, through mux 250 to C-register 246.

The multiplication of the value stored in A-register 244 by the most significant data bit stored in B-register 242, i.e., the value B(4), generates the first partial product. Thus, by way of example, A-register 244 has a binary value 10110 ($x^4 + x^2 + x$, in polynomial form) that is multiplied by B(4), i.e., a binary one value 1̲1101 ($x^4$, in polynomial form). The irreducible polynomial N has a value of 100101 ($x^5 + x^2 + 1$, in polynomial form)

| (1) | 10110 | <== value stored in A-register 244 |
|---|---|---|
| (2) | × 1̲1101 | <== B(4), most significant bit |
| (3) | 10110 | <== first partial product result |

The first partial product is added to a previous partial product, initially having a value of zero based on a reset of C-register 246, providing a summed value of 10110. In the next multiplication cycle, the data in B-register 242 is shifted to the left and the next most significant data bit of B-register 242 is transferred through mux 250 to C-register 246. C-register 246 multiplies the value stored in A-register 244 by the next most significant data bit. Thus, the binary value 10110 ($x^4 + x^2 + x$, in polynomial form) is multiplied by B(3), i.e., a binary one value 1̲1101 ($x^3$, in polynomial form).

| (1) | 10110 | <== value stored in A-register 244 |
|---|---|---|
| (4) | × 1̲1101 | <== B(3), next least significant bit |
| (5) | 10110 | <== second bit multiply result |

The second bit multiply result (5) is summed with the stored previous result to generate the second partial product (6).

| (3) | 10110 | <== first partial product |
|---|---|---|
| (5) | + 10110 | <== second bit multiply result |
| (6) | 111010 | <== second partial product |

The logic value of a particular bit location is tested to determine whether the partial product should be reduced. When the value of the data bit at the particular bit location has a logic one value, the value of N is aligned to that particular bit location and added to the partial product. In this case, the particular bit location is the most significant data bit location of the generated second partial product. The value of the data bit at the particular bit location has a logic one value (1̲11010). Therefore, the value of N is aligned ($x^3 * N$) and subtracted from the most significant data bit location.

It should be noted that when computing modular polynomial-basis multiplications, multiplier 240 does not propagate a carry signal and, therefore, the operation of "adding" or "subtracting" is an exclusive-OR of the two values. It should be further noted that the most significant data location of the second partial product is reduced to a zero value by the addition of N.

```
(6)      111010   <== second partial product
(7)    - 100101   <== aligned value of N (x⁸ x⁵ + x³)
(8)      011111   <== reduced second partial product
                      (x⁷ + x⁶ + x⁵ + x⁴ + x³)
```

The third bit multiply involves the multiplication of the value stored in A-register 244 by the logic value of B(2), i.e., the value of the data bit located in the third bit location (11<u>1</u>01) from the left in B-register 242.

```
(1)      10110    <== value stored in A-register 244
(9)    × 11101    <== B(2), next most significant bit
(10)     10110    <== third bit multiply result
```

Following the third bit multiply, the product of the third bit multiply (10) is added to the previous result, i.e., the reduced second partial product (8), to provide the third partial product (11).

```
(8)      011111   <== reduced second partial product
(10)   + 10110    <== third bit multiply (x⁶ + x⁴ + x³)
(11)     0101000  <== third partial product (x⁷ + x⁵)
```

The logic value of the particular bit location of the third partial product determines whether the third partial product should be reduced. In this example, the particular bit location is the second bit location from the left (0<u>1</u>01000). The second data bit has a logic one value and accordingly, the value of N is aligned ($x^2$*N) and subtracted from the third partial product.

```
(11)     0101000  <== third partial product (x⁷ + x⁵)
(12)   - 100101   <== aligned value of N (x⁷ + x⁴ + x²)
(13)     0001101  <== reduced third partial product
                      (x⁵ + x⁴ + x²)
```

The fourth bit multiply involves the multiplication of the value stored in A-register 244 by the logic value of B(1), i.e., the value of the data bit located in the fourth bit location (111<u>0</u>1) from the left in B-register 242.

```
(1)      10110    <== value stored in A-register 244
(14)   × 11101    <== B(1), next most significant bit
(15)     00000    <== fourth bit multiply result
```

Following the fourth bit multiply, the fourth bit multiply result (15) is added to the reduced third partial product (13) to provide the fourth partial product (16).

```
(13)     0001101  <== reduced third partial product
(15)   + 00000    <== fourth bit multiply result
(16)     00011010 <== fourth partial product
                      (x⁵ + x⁴ + x²)
```

The logic value of the particular bit location of the fourth partial product determines whether the fourth partial product should be reduced. In this example, the particular bit location is the third bit location from the left (00<u>0</u>11010). The third data bit has a logic zero value and accordingly, the value of N is not added to the fourth partial product.

The fifth bit multiply involves the multiplication of the value stored in A-register 244 by the logic value of B(0), i.e., the value of the data bit located in the fifth bit location (1110<u>1</u>) from the left in B-register 242.

```
(1)      10110    <== value stored in A-register 244
(17)   × 11101    <== B(0), next most significant bit
(18)     10110    <== fifth bit multiply result
```

Following the fifth bit multiply, the fifth bit multiply result (18) is added to the reduced fourth partial product (16) to provide the fifth partial product (19).

```
(16)     00011010 <== reduced fourth partial product
(18)   + 10110    <== fifth bit multiply result
(19)     000100010 <== fifth partial product
                      (x⁵ + x)
```

The logic value of the particular bit location of the fifth partial product determines whether the fifth partial product should be reduced. In this example, the particular bit location is the fourth bit location from the left (000<u>1</u>00010). The fourth data bit has a logic one value and accordingly, the value of N is aligned and subtracted from the fifth partial product.

```
(19)     000100010 <== fifth partial product
(20)   - 100101   <== the value of N properly aligned
(21)     000000111 <== reduced fifth partial product
                      (x² + x + 1)
```

The multiplication process continues until B-register 242 has shifted the stored value of operand B though mux 250, one data bit per multiplication cycle, to C-register 246 and C-register 246 has generated the product (A*B mod N). The (A mod N) term, having a binary value of 10110 ($x^4+x^2+x^1$, in polynomial form), is multiplied with the (B mod N) term, having a binary value of 11101 ($x^4+x^3+x^2+1$, in polynomial form) to generate the binary value of 000000111 ($x^2+x+1$, in polynomial form).

FIG. 8 is a schematic diagram of another cell that can be used in all bit locations of C-register 246 of multiplier 240 (FIG. 6) for two-cycle multiplication operations. Referring to FIG. 6, cell 280 (FIG. 8) describes the logic for cells $C_{(n-1)}$, $C_{(n-2)}$, . . . , and $C_0$ of C-register 246. A logic zero at input INT/POLY of multiplier 240 selects the multiplier for computing modular polynomial-basis multiplications. Referring to FIG. 8, a latch in cell 280 latches the value ($A_i*B_i \oplus N_i*C_{HIGH} \oplus C_{(i-1)}$), where $A_i$, $B_i$, and $N_i$ are values stored at a particular bit location (designated as bit location i) of A-register 244, B-register 242, and N-register 248, respectively. $C_{HIGH}$ is the value of the most significant data bit that is stored in C-register 246. $C_{(i-1)}$ is the previous partial product from an adder cell that is located adjacent to the "ith" cell in C-register 246.

On the other hand, when multiplier 240 (FIG. 6) is selected for computing integer-modulo-N multiplications, cell 280 latches the value ($A_i*B_i \oplus CARRYIN0_{(i-1)} \oplus C_{(i-1)}$), where $A_i$ and $B_i$ are values stored at a particular bit location (designated as bit location i) of A-register 244 and B-register 242, respectively. $CARRYIN0_{(i-1)}$ is the carry signal that propagates from the adder cell that is located adjacent to the "ith" cell in C-register 246. $C_{(i-1)}$ is a previous partial product value that is stored in the adder cell that is located adjacent to the "ith" cell in C-register 246.

If the least significant data bit (LSB) that is latched in C-register 246 (FIG. 6) has a logic one value, then a second multiplication cycle is used to determine $C_i \oplus N_i \oplus CARRYIN_{0(i-1)}$ and cause a reduction of the generated partial product. This is indicated by the REDUCED input signal having a logic one value. $N_i$ is a value stored at a particular bit location (designated as bit location i) of N-register 248. Thus, the first multiplication cycle computes the partial product of $A_i * B_i$, and depending on the calculated partial product, the second multiplication cycle reduces the partial product. A feedback path provides the value of $C_i$ to mux 282 and a conduction path provides the value of $N_i$ through mux 284 to inputs of full adder 286 during the second multiplication cycle. On average, about 50 percent of the time the second multiplication cycle is needed in generating the reduced product $(A*B*R^{-1} \mod N)$.

By now it should be appreciated that the present invention provides a cryptographic multiplication system that achieves high performance, low cost, and low-power for implementation in an integrated circuit. The hardware multiplier achieves high performance by computing a product of two operands to support the RSA and ECC algorithm. The multiplication system is adaptable to large operands and performs calculations in fewer clock cycles than in prior art systems.

What is claimed is:

1. A multiplier having a plurality of interconnected multiplier cells, wherein a first one of the multiplier cells comprises:
   a first adder having a data input coupled for receiving a first data signal, a second input, and an output that supplies a data output signal; and
   a blocking circuit having an input coupled for receiving a carryin signal, an output coupled to the second input of the first adder, and a control input coupled for receiving a select signal;
   a second adder having first and second inputs coupled for receiving respective second and third data signals;
   a third adder having a first input coupled to a first output of the first adder and a second input coupled to a first output of the second adder; and
   a fourth adder having a first input coupled to a first output of the third adder, a second input coupled to a second output of the first adder, and a third input coupled to a second output of the second adder.

2. The multiplier of claim 1, wherein the first and fourth adders are full adders.

3. The multiplier of claim 1, wherein the second and third adders are half adders.

4. The multiplier of claim 1, wherein the multiplier cell further includes a latch having an input coupled to an output of the third adder and an output that supplies a stored product value generated by the multiplier cell.

5. The multiplier of claim 1, wherein the fourth adder has an output that provides a carryout signal.

* * * * *